United States Patent [19]
Aitken et al.

[11] Patent Number: 5,389,584
[45] Date of Patent: Feb. 14, 1995

[54] GA- AND/OR IN-CONTAINING ASGE SULFIDE GLASSES

[75] Inventors: Bruce G. Aitken; Mark A. Newhouse, both of Corning, N.Y.

[73] Assignee: Corning Incorporated, Corning, N.Y.

[21] Appl. No.: 225,766

[22] Filed: Apr. 11, 1994

[51] Int. Cl.$^6$ .......................... C03C 3/32; C03C 4/10
[52] U.S. Cl. ........................................ 501/40; 501/904
[58] Field of Search ............................ 501/37, 40, 904

[56] References Cited

U.S. PATENT DOCUMENTS

| | | | |
|---|---|---|---|
| 4,087,511 | 5/1978 | Ropp | 423/277 |
| 4,214,249 | 7/1980 | Kasai et al. | 346/76 L |
| 4,599,462 | 7/1986 | Michl | 568/702 |
| 4,612,294 | 9/1986 | Katsuyama et al. | 501/40 |
| 4,704,371 | 11/1987 | Krolla et al. | 501/40 |
| 4,973,345 | 11/1990 | France | 501/40 X |
| 5,240,885 | 8/1993 | Aitken et al. | 501/40 |
| 5,315,434 | 5/1994 | Mizuno et al. | 359/355 |

FOREIGN PATENT DOCUMENTS 0095625  5/1983  Japan .................................... 501/37

*Primary Examiner*—Mark L. Bell
*Assistant Examiner*—David Sample
*Attorney, Agent, or Firm*—C. S. Janes, Jr.

[57] ABSTRACT

This invention is directed to the production of transparent glasses exhibiting excellent transmission far into the infrared region of the electromagnetic radiation spectrum, said glasses consisting essentially, expressed in terms of mole percent on the sulfide basis, of 55-95% $GeS_2$, 2-40% $As_2S_3$, 0.01-20% $R_2S_3$, wherein R is at least one trivalent network forming cation selected from the group consisting of gallium and indium, 0-10% $MS_x$, wherein M is at least one modifying cation selected from the group consisting of aluminum, barium, cadmium, calcium, lead, lithium, mercury, potassium, silver, sodium, strontium, thallium, tin, yttrium, and a rare earth metal of the lanthanide series, 0-20% total of at least one halide selected from the group consisting of chloride and fluoride, 0-5% total selenide, and wherein the sulfur and/or selenium content can vary between 85-125% of the stoichiometric value. The difference between the temperature of the onset of crystallization and the transition temperature of the glasses is at least 150° C. and commonly will be greater than 200° C.

3 Claims, 1 Drawing Sheet

GA- AND/OR IN-CONTAINING ASGE SULFIDE GLASSES

RELATED APPLICATION

U.S. Ser. No. 08/225,767, filed concurrently herewith by the present applicants under the title GALLIUM SULFIDE GLASSES and assigned to the same assignee as the present application, is directed to transparent glasses exhibiting excellent transmission far out into the infrared region of the electromagnetic radiation spectrum consisting essentially, in mole percent on the sulfide basis, of 40–80% $Ga_2S_3$, 0–35% $RS_x$, wherein R is at least one network forming cation selected from the group of aluminum, antimony, arsenic, germanium, and indium, 1–50% $Ln_2S_3$, wherein Ln is at least one cation selected from the group of a rare earth metal and yttrium, and 1–45% $MS_x$, wherein M is at least one modifying cation selected from the group of barium, cadmium, calcium, lead, lithium, mercury, potassium, silver, sodium, strontium, thallium, and tin, and 0–10% total chloride and/or fluoride. Glasses consisting essentially, in mole percent on the sulfide basis, of 5–30% $Ga_2S_3$, 0–10% $R_2S_3$, wherein R is at least one network forming cation selected from the group of aluminum, antimony, arsenic, and indium, 55–94.5% $GeS_2$, 0.5–25% $MS_x$, wherein M is at least one modifying metal cation selected from the group of barium, cadmium, calcium, lead, lithium, mercury, potassium, silver, sodium, strontium, thallium, tin, yttrium, and a rare earth metal of the lanthanide series, 0–10% total selenide, 0–25% total chloride and/or fluoride, and wherein the sulfur and/or selenium content can vary between 85–125% of the stoichiometric value, demonstrate exceptionally high values of $\tau$ when doped with Pr.

BACKGROUND OF THE INVENTION

U.S. Pat. No. 5,240,885 (Aitken et al.) describes the preparation of rare earth metal-doped cadmium halide glasses, which glasses transmit radiation well into the infrared portion of the electromagnetic radiation spectrum due to their low phonon energy. That capability commended their utility for the fabrication of efficient lasers, amplifiers, and upconverters when doped with the appropriate rare earth metals. Because metal-sulfur bonds are generally weaker than metal-oxygen bonds, sulfide glasses exhibit much lower phonon energies than oxide glasses and, therefore, transmit radiation much further into the infrared region of the electromagnetic radiation spectrum. Accordingly, sulfide glasses were seen to have the potential of being excellent host materials of rare earth metals for applications such as those listed above requiring efficient radiative emission.

Unfortunately, however, many sulfide glasses are black and, consequently, are unsuitable for some of the above applications inasmuch as such a host glass would tend to absorb the pump radiation instead of the rare earth metal dopant. One of the best known sulfide glasses, viz., arsenic sulfide, is transparent to radiation in the long wavelength range of the visible portion of the radiation spectrum as well as far into the infrared region and, hence, would appear to be a suitable host glass for rare earth metals. Nevertheless, rare earth metals have been found to be relatively insoluble in arsenic sulfide glasses, and it has proven to be difficult to dope those glasses with enough rare earth metal for sufficient pump power absorption.

Rare earth metals are known to be very soluble in most oxide glasses and their apparent insolubility in arsenic sulfide glasses has been conjectured to be due to the gross structural dissimilarity existing between the latter and oxide glasses. Arsenic sulfide glasses are believed to consist of long chains and layers of covalently bonded pyramidal $AsS_3$ groups, whereas oxide glasses typically comprise a three-dimensional network of relatively ionically bonded $MO_4$ tetrahedra, where M is a so-called network-forming metal such as silicon, phosphorus, aluminum, boron, etc. Rare earth metals are readily accommodated in these ionic network structures where they can compensate charge imbalances that arise from the presence of two or more network-forming metals, e.g., aluminum and silicon in aluminosilicate glasses—energetically similar sites may not exist in the two-dimensional covalent structures typical of arsenic sulfide and related glasses.

One system of sulfide glasses which exhibit good transparency in beth the visible and infrared portions of the radiation spectrum, and which possess a relatively ionic three-dimensional structure that would be expected to be more accommodating of rare earth metals, comprises the gallium sulfide glasses disclosed in Ser. No. 08/225,767, supra. In contrast to arsenic sulfide glasses, the structure of the glasses disclosed in Ser. No. 08/225,767 is based upon a three-dimensional linkage of corner sharing $GaS_4$ tetrahedra. Rare earth metals are readily soluble in these glasses. In fact, some of the most stable gallium sulfide glasses contain a rare earth metal as a major constituent.

SUMMARY OF THE INVENTION

Ser. No. 08/225,767, supra, disclosed certain gallium sulfide-containing glass compositions which, when doped with a suitable rare earth metal of the lanthanide series such as praseodymium, exhibit characteristics rendering them well-suited for the fabrication of amplifier, laser, and/or upconverter devices. In the particular application of 1300 nm optical amplication, those glasses assumed the role of excellent hosts for praseodymium, the rare earth metal of choice, due to their exceptional transmission far into the infrared region of the electromagnetic radiation spectrum with, consequently, a low probability of nonradiative deactivation of the desired fluorescence. Although those glasses demonstrate relatively good thermal stability, as gauged by the temperature range $T_x-T_g$, i.e., the difference between the temperature of the onset of crystallization ($T_x$) and the glass transition temperature ($T_g$), research was continued having the objective to discover new transparent glass compositions exhibiting even greater thermal stability, while retaining the basic properties of the inventive gallium sulfide-containing glasses, so as to assure avoidance of devitrification when forming the glasses into fibers. That objective can be secured in glasses having compositions consisting principally of arsenic, germanium, and sulfur with small, but necessary inclusions of gallium and/or indium. Minor amounts of other glass modifiers such as Al Sb, Li, Na, K, Ca, Sr, Ba, Ag, Hg, Tl, Cd, Sn, Pb, Y, and a rare earth metal of the lanthanide series may optionally be incorporated to adjust such properties as thermal expansion, refractive index, and thermal stability. The present invention is founded upon two fundamental features: first, the recognition that increased concentrations of As in gallium germanium sulfide glasses impart enhanced thermal stability to those glasses; and second, the recognition that the presence of some Ga and/or In is necessary to assure that the fluorescence at 1300 nm is not quenched as evaluated by measurement of the fluorescence lifetime ($\tau$).

The compositions of the subject inventive glasses consist essentially, expressed in terms of mole percent on the sulfide basis, of about 55-95% $GeS_2$, 2-40% $As_2S_3$, 0.01-20% $R_2S_3$, wherein R is at least one trivalent network forming cation selected from the group consisting of gallium and indium, 0-10% $MS_x$, wherein M is at least one modifying cation selected from the group consisting of aluminum, antimony, barium, cadmium, calcium, lead, lithium, mercury, potassium, silver, sodium, strontium, thallium, tin, yttrium, and a rare earth the lanthanide series, 0-20% total chloride and/or fluoride, 0-5% total selenide, and wherein the sulfur and/or selenium content can vary between 85-125% of the stoichiometric value.

When glasses having compositions encompassed within the above ranges are doped with $Pr^{3+}$ ions in an amount equivalent to at least 0.005 mole percent $Pr_2S_3$, they exhibit a $\tau$ value of at least about 300 $\mu$sec. $Pr^{3+}$ ions in much larger concentrations are operable, but an amount equivalent to about 0.5 mole percent $Pr_2S_3$ has been considered to comprise a practical maximum.

PRIOR ART

U.S. Pat. No. 4,612,294 (Katsuyama et al.) is directed to infrared transmitting glasses for use in optical fibers wherein the glasses are selected from the group of selenium-germanium, selenium-germanium-antimony, and selenium-arsenic-germanium glasses, in which 2-100 ppm of at least one trivalent metal selected from the group of aluminum, gallium, and indium is incorporated. Sulfur is not a major component and the levels of selenium are far greater than can be tolerated in the present inventive glasses.

U.S. Pat. No. 4,704,371 (Krolla et al.) is drawn to glasses suitable for transmitting infrared radiation, the glasses comprising, expressed in terms of atom percent, 5-50% germanium, 25-94% selenium, 0.5-10% alkaline earth metal, 0-28% antimony, and 0-70% other, the other constituent being one or more of arsenic, bismuth, bromine, calcium, gallium, indium, iodine, lead, phosphorus, silicon, silver, strontium, sulfur, tellurium, thallium, and tin. The high levels of selenium place those glasses outside of the composition intervals of the subject inventive glasses.

DESCRIPTION OF PREFERRED EMBODIMENTS

Figure 1:
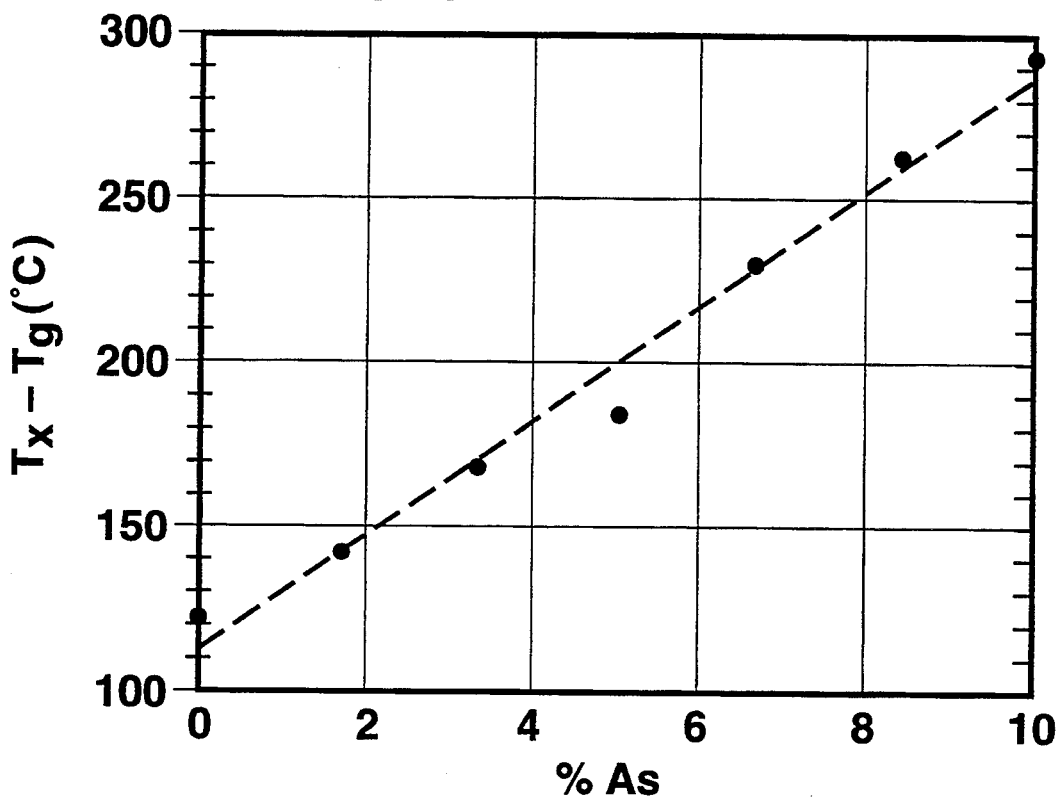
FIG. 1 comprises a graph illustrating the improvement in thermal stability imparted to the glass through additions of arsenic to the base composition.

Table I reports a group of glass compositions, expressed in terms of mole percent on the sulfide basis, illustrating the subject inventive glasses. The glass compositions were doped with $Pr^{3+}$ ions to measure the level of $\tau$. Because the glasses were prepared in the laboratory, the glasses were typically prepared by melting mixtures of the respective elements, although in some cases a given metal was batched as a sulfide. As can be appreciated, however, that practice is expensive and not necessary. The actual batch ingredients can be any materials which, upon melting together with the other batch components, are converted into the desired sulfide in the proper proportions.

The batch constituents were compounded, mixed together thoroughly, and sealed into silica or VYCOR® ampoules which had been evacuated to about $10^{-5}$ to $10^{-6}$ Torr. The ampoules were placed into a furnace designed to impart a rocking motion to the batch during melting. After melting the batch for about 1-2 days at 850°-950° C., the melts were quenched in a blast of compressed air to form homogeneous glass rods having diameters of about 7-10 mm and lengths of about 60-70 mm, which rods were annealed at about 325°-425° C.

Table I also records the transition temperature (Tg) and the temperature of the onset of crystallization ($T_x$), expressed in terms of °C., the difference in temperature between those measurements ($T_x - T_g$), and the value of $\tau$, expressed in terms of $\mu$sec, of each glass where measured.

TABLE I

|  | 1 | 2 | 3 | 4 | 5 | 6 |
|---|---|---|---|---|---|---|
| $Ga_2S_3$ | 7.73 | 6.44 | 6.44 | 5.18 | 3.95 | 3.95 |
| $GeS_2$ | 89.27 | 87.69 | 87.69 | 86.18 | 84.72 | 84.72 |
| $As_2S_3$ | 2.97 | 5.84 | 5.84 | 8.62 | 11.31 | 11.31 |
| $Pr_2S_3$ | 0.02 | 0.02 | 0.02 | 0.02 | 0.02 | 0.02 |
| Excess S | — | 112.4 | — | — | 103.9 | — |
| $T_g$ | 424 | 323 | 387 | 376 | 324 | 346 |
| $T_x$ | 566 | 515 | 558 | 563 | 545 | 576 |
| $T_x - T_g$ | 142 | 192 | 171 | 186 | 220 | 231 |
| $\tau$ | 336 | — | — | — | 340 | 340 |

|  | 7 | 8 | 9 | 10 | 11 | 12 |
|---|---|---|---|---|---|---|
| $Ga_2S_3$ | 2.78 | 3.33 | 0.83 | 1.67 | — | 12.67 |
| $In_2S_3$ | — | — | — | — | 0.83 | — |
| $GeS_2$ | 83.31 | 66.65 | 83.31 | 83.31 | 83.31 | 87.30 |
| $As_2S_3$ | 13.88 | 29.99 | 15.83 | 15.00 | 15.83 | — |
| $Pr_2S_3$ | 0.02 | 0.03 | 0.03 | 0.03 | 0.03 | 0.03 |
| Excess S | — | 106.1 | — | — | — | — |
| $T_g$ | 341 | 273 | 348 | 340 | 348 | 422 |
| $T_x$ | 602 | >517 | 615 | 630 | 618 | 544 |
| $T_x - T_g$ | 261 | >245 | 267 | 290 | 274 | 122 |
| $\tau$ | 366 | 303 | 351 | — | 315 | 354 |

|  | 13 | 14 | 15 | 16 | 17 | 18 |
|---|---|---|---|---|---|---|
| $In_2S_3$ | 1.67 | 2.50 | — | — | — | — |
| $Al_2S_3$ | — | — | 0.83 | 1.67 | 2.50 | — |
| $GeS_2$ | 83.31 | 83.31 | 83.31 | 83.31 | 83.31 | 83.31 |
| $As_2S_3$ | 15.00 | 14.17 | 15.83 | 15.00 | 14.17 | 16.67 |
| $Pr_2S_3$ | 0.03 | 0.03 | 0.03 | 0.03 | 0.03 | 0.03 |
| $T_g$ | 345 | 355 | 349 | 347 | 312 | 336 |
| $T_x$ | 600 | 615 | 613 | 602 | 614 | 628 |
| $T_x - T_g$ | 255 | 259 | 264 | 256 | 302 | 292 |
| $\tau$ | 312 | 300 | 0 | 0 | 0 | 0 |

Table II recites the same glass compositions, but expressed in terms of atomic percent.

TABLE II

|  | 1 | 2 | 3 | 4 | 5 | 6 |
|---|---|---|---|---|---|---|
| Ga | 4.81 | 3.67 | 3.97 | 3.16 | 2.33 | 2.39 |
| Ge | 27.77 | 24.99 | 27.02 | 6.31 | 24.99 | 25.63 |
| As | 1.85 | 3.33 | 3.60 | 5.26 | 6.67 | 6.84 |
| S | 65.55 | 68.0 | 65.40 | 65.26 | 166.0 | 65.13 |
| Pr | 0.015 | 0.014 | 0.015 | .015 | 0.015 | 0.015 |

|  | 7 | 8 | 9 | 10 | 11 | 12 |
|---|---|---|---|---|---|---|
| Ga | 1.67 | 1.75 | 0.50 | 1.00 | — | 7.79 |
| In | — | — | — | — | 0.50 | — |
| Ge | 24.99 | 17.49 | 24.99 | 24.99 | 24.99 | 26.83 |
| As | 8.33 | 15.74 | 9.50 | 9.00 | 9.50 | — |
| S | 65.00 | 65.00 | 65.00 | 65.00 | 65.00 | 65.37 |
| Pr | 0.015 | 0.015 | 0.015 | 0.015 | 0.015 | 0.015 |

TABLE II-continued

|    | 13    | 14    | 15    | 16    | 17    | 18    |
|----|-------|-------|-------|-------|-------|-------|
| In | 1.00  | 1.50  | —     | —     | —     | —     |
| Al | —     | —     | 0.50  | 1.00  | 1.50  | —     |
| Ge | 24.99 | 24.99 | 24.99 | 24.99 | 24.99 | 24.99 |
| As | 9.00  | 8.50  | 9.50  | 9.00  | 8.50  | 10.00 |
| S  | 64.99 | 65.00 | 65.00 | 64.99 | 65.00 | 65.00 |
| Pr | 0.015 | 0.015 | 0.015 | 0.015 | 0.015 | 0.015 |

It will be appreciated that the above-described procedures represent laboratory practice only. That is, the batches for the inventive glasses can be melted in large commercial glass melting units and the resulting melts formed into desired glass shapes utilizing commercial glass forming techniques and equipment. It is only necessary that the batch materials be heated to a sufficiently high temperature for an adequate period of time to secure a homogeneous melt, and that melt thereafter cooled and simultaneously shaped into a body of a desired configuration at a sufficiently rapid rate to avoid the development of devitrification.

The thermal stabilizing effect of As is illustrated in FIG. 1 wherein $T_x - T_g$ values are plotted as a function of the As content of several arsenic gallium germanium sulfide glasses. Laboratory experience has demonstrated that this stabilizing effect of As holds for both stoichiometric glasses and glasses containing excess sulfur. In both series of glasses, As essentially replaces Ga while maintaining the Ge content (in terms of atomic percent) at an approximately constant value. It is readily apparent from an examination of FIG. 1 that glass compositions containing about 2 atomic percent As demonstrate $T_x - T_g$ values of about 150° C. and at somewhat more than about 5% As exhibit thermal stabilities in excess of 200° C., which value constitutes about the maximum limit for the barium-stabilized gallium germanium sulfide glasses disclosed in Ser. No. 08/225,767, supra. In contrast, As-free Example 12 offers a $T_x - T_g$ value no greater than about 120° C. Example 7, containing 8.33 atomic percent As, exhibits a $T_x - T_g$ value of about 260° C. Based upon extrapolated viscosity data for related arsenic sulfide and germanium-rich sulfide glasses, it has been estimated that one could reheat such a glass to a viscosity as low as 100 MPa ($10^3$ poise) without crystallization. Inasmuch as the preferred glass viscosities for drawing fiber via a redraw process reside in the range of $10^4$–$10^6$ MPa ($10^5$–$10^7$ poise), a glass such as Example 7 ought to demonstrate more than adequate thermal stability to allow fiber fabrication via a preform redraw process.

Figure 2:
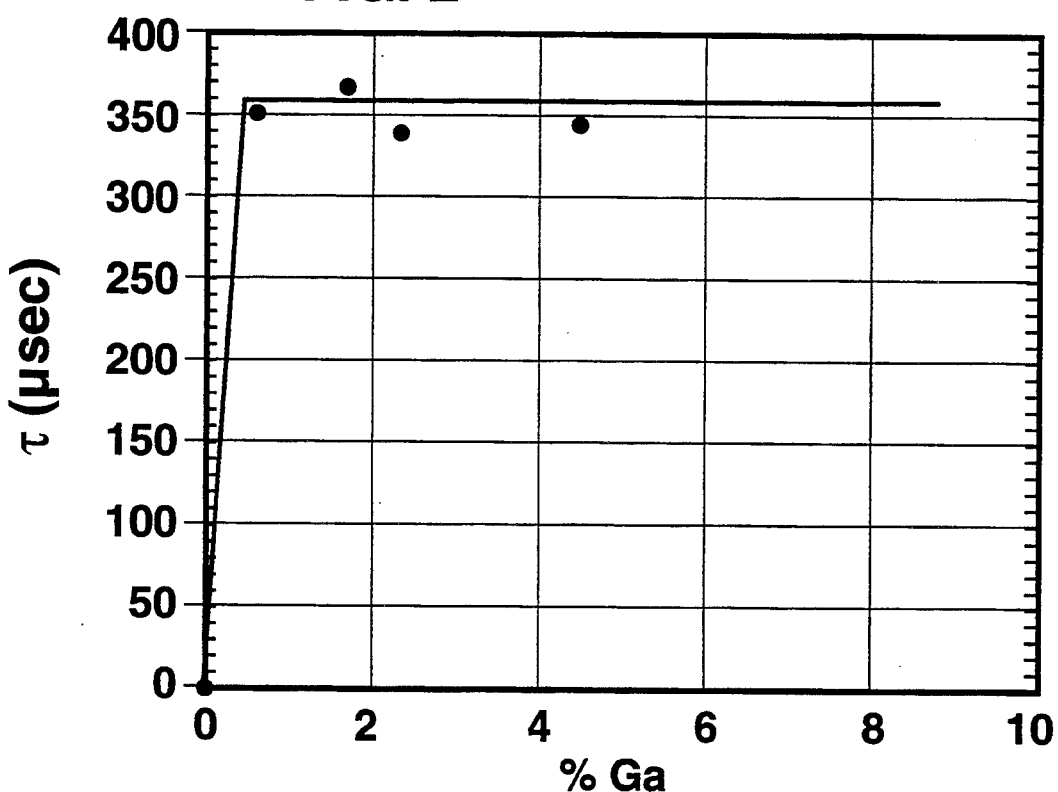
FIG. 2 comprises a graph illustrating the effect on the lifetime of the fluorescence at 1300 nm ($\tau$) exhibited by the base glass doped with $Pr^{3+}$ ions resulting from the inclusion of gallium in the glass composition.

The need for incorporating some gallium and/or indium into the composition of the subject inventive glasses is illustrated through an inspection of FIG. 2, wherein the lifetime of the fluorescence of the glass at a wavelength of 1300 nm imparted by the $Pr^{3+}$ doping ($\tau$) is plotted as a function of the gallium content of arsenic gallium germanium sulfide glass. The glass compositions plotted in FIG. 2 are the same as those of the stoichiometric series pictured in FIG. 1. The data make clear that the $\tau$ for these glasses remains relatively constant at a value of about 350 μsec, provided that the glass composition contains gallium, the minimum effective concentration thereof being slightly in excess of that of the active rare earth dopant. Thus, for glasses doped with 0.02% Pr, the minimum effective gallium and/or indium concentration is about 0.03 atomic percent. For binary arsenic germanium sulfide glasses containing no gallium, $\tau$ is essentially zero and the fluorescence at 1300 nm is essentially quenched, as is illustrated in Example 18. It has been hypothesized that the presence of gallium and/or the analogous trivalent network forming cation In, creates relatively underbonded sulfur sites in these glasses. These underbonded sulfur ions, in turn, provide suitable structural sites for the incorporation of modifying cations, in this case those of the rare earth metal Pr. It has been assumed that gallium and/or indium is randomly distributed throughout the inventive glasses, thereby providing a mechanism for the uniform dispersal of the rare earth dopant and, consequently, avoiding the well recognized phenomenon of concentration quenching.

Whereas aluminum is disclosed in Ser. No 08/225,767 to be a satisfactory network forming cation, laboratory experience has demonstrated that aluminum, unlike gallium and indium, is ineffective in avoiding fluorescence quenching in the present inventive glasses, as is illustrated in Example 15, 16, and 17. Therefore, whereas aluminum may be included as an optional modifier, where the avoidance of fluorescence quenching is desired, gallium and/or indium will be present.

Based on an overall balance of properties, the preferred inventive composition ranges consist essentially, expressed in terms of mole percent on the sulfide basis, of 60–95% $GeS_2$, 5–30% $As_2S_3$, 0.1–15% $R_2S_3$, wherein R is at least one trivalent network forming cation selected from the group consisting of Ga and In, 0–10% $MS_x$, wherein M is at least one modifying cation selected from the group consisting of aluminum, barium, cadmium, calcium, lead, lithium, mercury, potassium, silver, sodium, strontium, thallium, tin, yttrium, and a rare earth metal of the lanthanide series, 0–10% total chloride and/or fluoride, 0–3% total selenide and wherein the sulfur and/or selenium content can vary between 90–120% of the stoichiometric value.

Example 9 constitutes the most preferred embodiment of the invention.

We claim:

1. A transparent glass exhibiting excellent transmission far into the infrared region of the electromagnetic spectrum and wherein the difference between the temperature of the onset of crystallization and the transition temperature is at least about 150° C., said glass consisting essentially, expressed in terms of mole percent on the sulfide basis, of 55–95% $GeS_2$, 2–40% $As_2S_3$, 0.01–20% $R_2S_3$, wherein R is at least one trivalent network forming cation selected from the group consisting of gallium and indium, 0–10% $MS_x$, wherein M is at least one modifying cation selected from the group consisting of aluminum, antimony, barium, cadmium, calcium, lead, lithium, mercury, potassium, silver, sodium, strontium, thallium, tin, yttrium, and a rare earth metal of the lanthanide series, 0–20% total of at least one halide consisting of chloride and fluoride, 0–5% total selenide, and wherein the sulfur and/or selenium content can vary between 85–125% of the stoichiometric value.

2. A transparent glass according to claim 1 which, when doped with praseodymium is an amount equivalent to at least 0.005% $Pr_2S_3$, exhibits a value of $\tau$ of at least about 300 μsec.

3. A transparent glass exhibiting transmission far into the infrared region of the electromagnetic radiation spectrum and wherein the difference between the temperature of the crystallization and the transition temperature is greater than 200° C., said glass consisting essentially, expressed in terms of mole percent on the sulfide basis, of 60-95% $GeS_2$, 5-30% $As_2S_3$, 0.1-15% $R_2S_3$, wherein R is at least one trivalent network forming cation selected from the group consisting of gallium and indium, 0-10% $MS_x$, wherein M is at least one modifying cation selected from the group consisting of aluminum, barium, cadmium, calcium, lead, lithium, mercury, potassium, silver, sodium, strontium, thallium, tin, yttrium, and a rare earth metal of the lanthanide series, 0-10% total of at least one halide selected from the group consisting of chloride and fluoride, 0-3% total selenide, and wherein the sulfur and/or selenium content can vary between 90-120% of the stoichiometric value.

* * * * *

UNITED STATES PATENT AND TRADEMARK OFFICE
CERTIFICATE OF CORRECTION

PATENT NO. : 5,389,584
DATED : February 14, 1995
INVENTOR(S) : Bruce G. Aitken and Mark A. Newhouse It is certified that error appears in the above-indentified patent and that said Letters Patent is hereby corrected as shown below:

Table II, column 5, change
"166.0" to --66.0--.

Column 6,
Claim 3, line 4, insert
"onset of" before crystallization.

Signed and Sealed this

Thirtieth Day of May, 1995

Attest:

BRUCE LEHMAN

Attesting Officer  Commissioner of Patents and Trademarks